United States Patent [19]

La Roche

[11] 4,038,028

[45] July 26, 1977

[54] SEWAGE SLUDGE-IRRADIATION DEVICE

[75] Inventor: Ulrich La Roche, Zurich, Switzerland

[73] Assignee: BBC Brown Boveri & Company Limited, Baden, Switzerland

[21] Appl. No.: 632,103

[22] Filed: Nov. 14, 1975

[30] Foreign Application Priority Data

Nov. 20, 1974 Switzerland ............... 15418/74

[51] Int. Cl.² ........................................... A61L 3/00
[52] U.S. Cl. ........................... 21/102 R; 21/DIG. 2; 210/386; 210/400; 250/433; 250/492 R
[58] Field of Search .............. 210/64, 386, 400, 401, 210/243; 21/102 R, DIG. 2; 162/280; 250/433, 492

[56] References Cited

U.S. PATENT DOCUMENTS

| 1,052,818 | 2/1913 | Henri et al. | 21/DIG. 2 |
| 2,132,705 | 10/1938 | Smith | 21/102 R |
| 3,104,197 | 9/1963 | Back et al. | 162/280 |
| 3,659,096 | 4/1972 | Kompanek | 210/64 UX |
| 3,834,985 | 9/1974 | Gullbey | 162/280 |
| 3,854,875 | 12/1974 | Bosshardt | 21/102 R |
| 3,914,173 | 10/1975 | Call et al. | 210/64 |
| 3,915,865 | 10/1975 | Haji et al. | 210/386 |

Primary Examiner—Theodore A. Granger
Attorney, Agent, or Firm—Werner W. Kleeman

[57] ABSTRACT

A sewage sludge-irradiation device for irradiating sewage sludge with radiation having a sterilizing effect. A conveyor system embodies at least two conveyor devices, at least one of which conveyor device is supplied with a layer of sewage sludge. The conveyor devices are arranged in a manner to form therebetween a passageway defining a mixing gap for the through-passing sewage sludge. A relative movement exists between the two conveyor devices, and radiation means cooperates with the conveyor system for irradiating the sewage sludge at a location prior to intermixing thereof in the mixing gap. The conveyor devices can be driven to possess respectively different speeds of movement, and it is also possible for one of the conveyor devices to be driven and the other to be stationary so as to define a stationary boundary means or surface for the mixing gap.

16 Claims, 2 Drawing Figures

SEWAGE SLUDGE-IRRADIATION DEVICE

BACKGROUND OF THE INVENTION

The present invention relates to a new and improved construction of apparatus for the irradiation of sewage waste, especially sewage sludge, with radiation having a sterilizing effect.

The sewage sludge formed during the biological treatment of sewage in a sewage treatment plant has already been pasteurized by heating the formed sewage sludge for the purpose of destroying bacteria, worms, pathogenic germs or the like. Such type treatment of the formed sewage sludge is of particular importance if the sludge is to be employed as fertilizer for agricultural purposes.

However, in order to avoid annoying odors, as such arise when thermally pasteurizing sewage sludge, it has been already proposed in the art to carry out pasteurization or sterilization of the sewage sludge with the aid of gamma radiation, following which the odorous annoyances are no longer present. Hence, there has been proposed to also effectively utilize as the radiation source, apart from e.g. cobalt 60 and cesium 137, the most powerful radiation substances of reactor wastes. In this regard reference may be made to the Swiss newspaper "Neue Zürcher Zeitung", issue published Aug. 6, 1973, No. 359, specifically the newspaper section thereof entitled "Forschung und Technik".

Furthermore, there is known in this particular field of technology a process wherein destruction of the germs or the like is effected by means of electron irradiation, the sewage sludge simultaneously being intermixed. The intermixing or agitation occurs by means of a pressurized medium, for instance compressed air, or also with the aid of pumps, there being especially utilized immersion pumps, or through the use of a stirrer or by jarring. Furthermore, for the intermixing there can be introduced into the treated material an active gas, for instance nitrogen or $CO_2$. In this regard attention is directed to German patent publication No. 2,337,406.

SUMMARY OF THE INVENTION

It is a primary object of the present invention to provide a new and improved construction of apparatus for irradiating sewage waste, particularly sewage sludge, with radiation having a sterilizing effect, in a particularly reliable, effective and simple manner.

Another object of the present invention aims at the provision of a new and improved construction of apparatus rendering possible essentially odorless pasteurization of sewage sludge.

A further object of the invention relates to sewage sludge-irradiation apparatus enabling sterilization of the sewage sludge without the need to resort to stirrer mechanisms or equivalent structure, inasmuch as during the irradiation with the sterilizing radiation, in particular, but not exclusively, an electron beam, there is formed only an approximately 1 millimeter thick surface layer having a high content of rapidly decaying chemically-activated water ions carrying out the sterilization activity or function, and wherein the layer of sewage sludge which is to be sterilized can be mixed with relatively no time delay with the remaining material in order to render possible extremely effective and faultless sterilization of the sewage sludge.

Now in order to implement these and still further objects of the invention, which will become more readily apparent as the description proceeds, the irradiation device or apparatus of this development for irradiating sewage waste, particularly sewage sludge, with radiation having a sterilizing effect, comprises a conveyor system incorporating means providing at least two conveyor devices, and means for supplying and depositing sewage sludge onto at least one of the conveyor devices. The conveyor devices are arranged such that there is formed therebetween a passageway for the throughflow of the deposited sewage sludge. This passageway defines a mixing gap for the intermixing of the sewage sludge contained therein. Means are provided for establishing a relative movement between the two conveyor devices, and radiation means cooperate with the conveyor system for irradiating the sewage sludge at a location prior to intermixing thereof in the mixing gap. The two conveyor devices may be constituted, for instance, by endless conveyor bands. The conveyor devices may be driven such that there exists therebetween different surface- or band velocities or speeds, but it is also possible for one of the conveyor devices to be stationary so as to form a stationary boundary wall or boundary means for the mixing gap formed by the passageway.

The radiation means is advantageously located at the conveyor system such that it can irradiate the sewage sludge or other waste directly prior to intermixing thereof in the mixing gap. The radiation means may advantageously emit an electron beam, although other radiation systems can be used to advantage, such as those emitting gamma- ultraviolet- or infrared-radiation, by way of example.

Due to the provision of a conveyor system composed of two conveyor devices, each possessing a different speed of movement or rotational speed, it is possible to move a thin sludge layer which has been deposited for instance onto the surface of a driven conveyor band or belt of one of the conveyor devices beneath a radiation device. This sludge layer, upon reaching the mixing gap which is formed between the conveyor bands of both conveyor devices, and wherein, for instance, one of both conveyor devices possesses a greater transport speed than the other, is intimately and intensively intermixed. Consequently, the more intensely irradiated particles located at the surface of the sludge layer which is conveyed beneath the source of radiation transfer their chemically-activated water ions to the weaker radiated lower layer or strata of the sludge layer, thereby rendering possible a notably improved sterilization.

According to a preferred embodiment of the invention there is provided means for forming a layer of sludge on one of the conveyor devices, this layer of sludge being in the form of a substantially coherent thin layer, typically no more than approximately 2 millimeters thickness. The means for forming such thin layer of sludge coacts with a sewage sludge container which supplies the sewage sludge to at least one of the conveying or conveyor devices. Such means for forming the sludge layer can comprise, for instance, a conventional doctor blade insuring for a relatively uniform application of the sewage sludge to the associated conveyor device, for instance upon the surface of the conveyor band or belt thereof. The doctor blade can be used to advantage when the sewage waste or sludge possesses a doughy-like consistency.

Other means for forming the layer of sludge on at least one of the conveyor devices can be used. Hence, according to a further aspect of the invention application of the sewage sludge to an associated conveyor device can be achieved with the aid of a spray nozzle system. This constructional manifestation is particularly then useful when the sewage sludge still contains admixed therewith a relatively large amount of water and thus is in the form of a slurry which can be sprayed upon the associated conveyor device.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
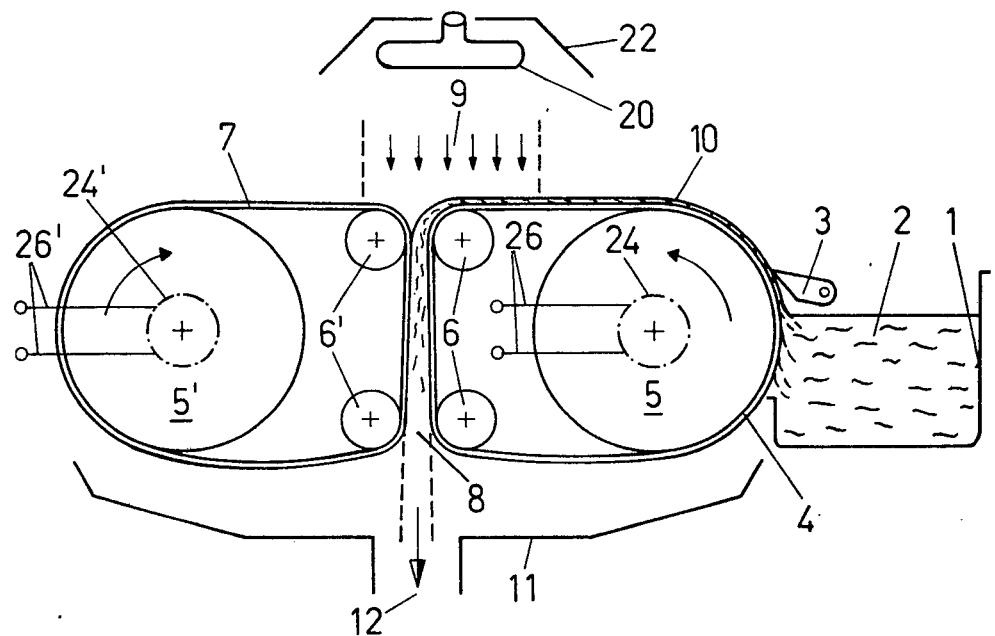
FIG. 1 schematically illustrates a first exemplary embodiment of apparatus or device for irradiating sewage sludge employing a doctor blade or equivalent structure for forming a relatively thin layer of sludge at an associated one of the conveyor devices.

Turning attention now to the drawing, two exemplary embodiments of apparatus for the irradiation of sewage waste, typically sewage sludge, with radiation having a sterilizing effect, have been illustrated, it being observed that essentially the same reference characters have been utilized throughout to denote the same or analogous components. Turning attention to the sewage sludge-irradiation apparatus of the embodiment of FIG. 1 there will be recognized a sludge container 1 for supplying sewage sludge 2 to at least a portion of the surface of a conveyor or conveying device, here shown in the form of a conveyor band or belt 4. This conveyor band 4 forms part of a conveyor system, conveyor band 4 being trained about a drive roller 5 and a number of deflecting or support rolls 6. The drive roller or roll 5 is driven, in the direction of the arrow, by means of a suitable drive motor 24 having the power supply lines 26 for the infeed of the energy to the drive motor 24. In this arrangement part of the surface of the conveyor band 4 passes through the sewage sludge container 1, picking-up on its surface the sewage sludge which adheres thereto owing to its relatively doughy-like consistency, by way of example. The sewage sludge adhering to the surface of the conveyor band 4 is then spread and deposited over the surface of the conveyor band 4 by means of a doctor blade 3 or equivalent structure so as to form a substantially coherent thin layer of sludge upon the surface of such conveyor band 4. Obviously other means for depositing the sludge upon the conveyor device can be utilized.

Continuing, it will be observed that the conveyor system embodies a further conveyor device, again for instance constituted by a conveyor band or belt 7 which is trained about a drive roller or roll 5' and the deflecting or support rolls 6'. This drive roller 5', like the drive roller 5 of the first discussed conveyor band 4, also has coaxially mounted on its shaft a suitable drive motor 24' provided with the power supply lines 26'. The two conveyor devices, here embodying by way of example the rotatable conveyor bands 4 and 7 or equivalent structure are arranged in spaced relationship from one another so as to form therebetween a substantially channel-like passageway providing a mixing gap 8 in which there can be thoroughly agitated and intermixed the sewage sludge for the purposes previously discussed. Above the conveyor system, and particularly, as shown, above the conveyor band 4 and the mixing gap there is arranged a suitable source of radiation, constituted by the radiation means 20 provided with a radiation screen member 22. The radiation, schematically indicated by the arrows 9, emitted by the radiation means 20 is predominantly directed onto the sewage sludge layer 10 deposited upon the conveyor band and the sewage sludge over the mixing gap 8 so as to provide a sterilizing effect upon such sewage sludge. The radiation means 20 is advantageously positioned such that it irradiates the sewage sludge directly prior to the time that it is extensively intermixed in the mixing gap. A particularly advantageous form of radiation means 20 is one which emits an electron beam, although other radiation systems for emitting other types of radiation, as previously disclosed, can also be utilized. Beneath the conveyor system formed by the two conveyor devices there is arranged a receiving container or vat 11 having a discharge opening or drain 12.

Figure 2:
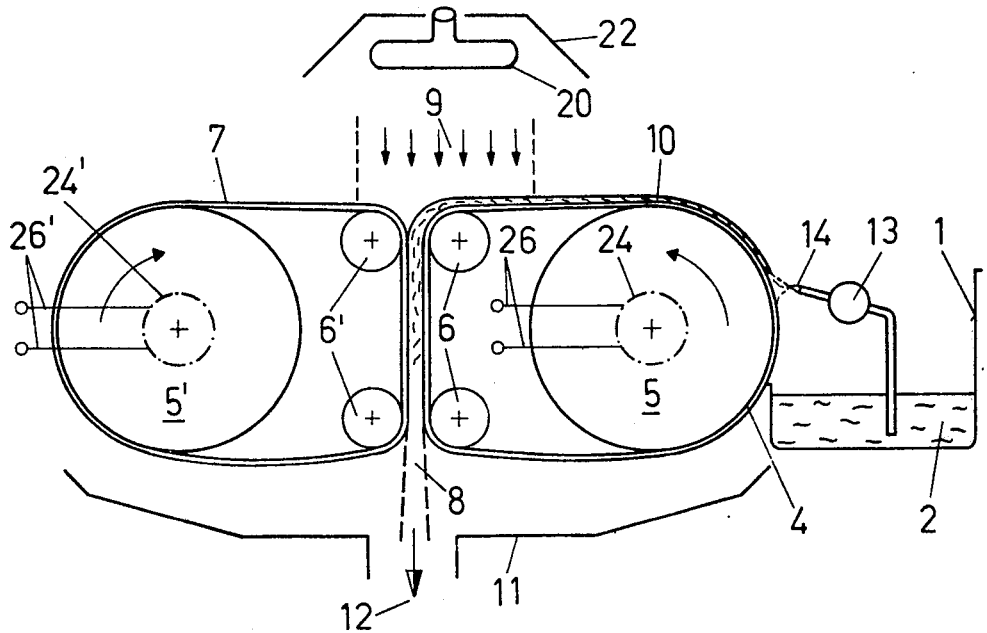
FIG. 2 illustrates a modified construction of sewage sludge-irradiation apparatus wherein the sewage sludge is applied to an associated conveyor device by means of a spray nozzle system.

Continuing, and turning attention to the variant embodiment of apparatus for the irradiation of sewage sludge or the like as shown in FIG. 2 it will be recognized that there is essentially illustrated the same conveyor system as discussed above with regard to the embodiment of FIG. 1, and therefore, as previously mentioned, generally the same reference characters have been used to denote the same or analogous components. In this modified version there is omitted the doctor blade 3 for spreading the sludge which was picked-up by the conveyor band 4 passing through part of the sewage sludge-supply container 1, and in this instance the sewage sludge 2 is applied to the surface of the associated conveyor band 4 by means of a spray nozzle system embodying one or a number of spray nozzles 14 and a pump 13. It thus will be appreciated that the pump 13 draws sewage sludge 2 out of the container 1 and ejects it through one or more of the nozzles 14 onto the surface of the conveyor band 4, to again form a substantially coherent thin layer of sludge thereon. This arrangement can be used to advantage when the sludge is present in the form of a slurry or the like.

Having now had the benefit of the above-discussion of the various embodiments of the apparatus structure of this development, the mode of operation thereof will now be considered and is as follows:

Both of the conveyor devices which are formed by the drive rollers or rolls 5 and 5', the support rolls 6 and 6' and the conveyor or transport bands 4 and 7 possess different rotational speeds, for instance in such a manner that the drive roller 5' rotates more rapidly than the drive roller 5. Consequently, the conveyor or transport band 7 possesses a greater peripheral speed. The sewage sludge or other waste is removed from the supply container 1, with the embodiment of FIG. 1 by means of the surface of the conveyor band 4 passing through the supply container 1 for picking-up thereon the sludge 2 which is then spread and applied in layer formation on such surface by the doctor blade 3 or equivalent structure, whereas in the embodiment of FIG. 2 the pump 13 and the spray nozzle or nozzles 14 spray and deposit the sludge 2 in the supply container 1 onto the associated conveyor band 4. The thus formed thin sludge layer 10 is irradiated with sterilizing radiation or rays 9, for instance an electron beam. As soon as this irradiated layer 10 has reached the channel-like mixing gap 8 it is, on the one hand, further transported by the conveyor band 4 and, on the other hand, intensively acted upon by the conveyor or transport band 7 which is here assumed to be rotating at a higher peripheral speed than the conveyor band 4, so that between both of these conveyor or transport devices there occurs an intensive intermixing of the sludge layer 10 in the mixing gap 8. As a result the more intensively irradiated surface layer or skin of the sludge layer 10, which contains a high content of rapidly decaying, chemically-activated water ions, is intimately intermixed with the lower situated less intensively irradiated layer or strata of such sludge layer 10, and thus, there is realized a substantially complete sterilizaton of the sewage sludge. After passing through the mixing gap 8 the sterilized sewage sludge 2 drops into the receiving container or vat 11, from which location this sterilized sludge 2 can be introduced through the agency of the discharge opening or drain 12 into a suitable transport container or other receptacle, not particularly shown to simplify the illustration.

Further, it is possible, instead of driving both of the conveyor devices 4 and 7 at different rotational speeds, to only drive one such conveyor device and to allow the other to be stationary. For instance, the drive motor 24' of the conveyor or transport band 7 defining such conveyor device can be placed out of operation so that the conveyor band 7 forms a stationary boundary wall or boundary means for the channel-like mixing gap. It will be appreciated that regardless of whether both conveyor devices 4 and 7 are driven, or only one of them is driven, there exists a relative movement between such two conveyor devices for promoting the intimate mixing of the sludge 2 in the mixing gap 8.

By way of completeness, it is mentioned that the invention is in no way limited to the exemplary embodiments illustrated in the drawings and described above, since modifications will readily suggest themselves to those skilled in the art, without departing from the teachings or underlying principles of the present invention. Thus, for instance, instead of using conveyor devices in the form of the conveyor or transport bands 4 and 7, there could be provided a respective cylinder equipped with axial grooves, there again being formed a mixing gap between both of the coacting cylinders and both cylinders could be driven with different rotational speeds, or even one of the cylinders need not be driven, comparable to what has been explained heretofore.

While there are shown and described present preferred embodiments of the invention, it is to be distinctly understood that the invention is not limited thereto, but may be otherwise variously embodied and practiced within the scope of the following claims.

Accordingly, what is claimed is:

1. An apparatus for irradiating sewage sludge with radiation having a sterilizing effect, comprising:
a conveyor system incorporating means for providing at least two cooperating conveyor devices,
means for supplying and depositing sewage sludge onto at least one of said conveyor devices,
said means for supplying and depositing sewage sludge onto at least one of said conveyor devices comprises a sewage sludge container for supplying the sewage sludge, said at least one conveyor device being structured to cooperate with said sludge container so as to withdraw the sewage sludge therefrom, and spreader means for spreading the withdrawn sludge deposited onto said at least one conveyor device over at least part of a surface thereof, said spreader means forming a substantially coherent thin layer of sewage sludge upon the surface of said at least one conveyor device, said spreader means comprising a material spreading element,
said conveyor devices being positioned relative to one another so as to form therebetween a passageway for the throughflow of the deposited sewage sludge, said passageway defining a mixing gap for the intermixing of the sewage sludge contained therein,
means for establishing a relative movement between said two conveyor devices,
said means for establishing a relative movement between said two conveyor devices comprises at least one drive means for driving at least one of said conveyor devices,
radiation means positioned relative to said conveyor system for irradiating the sewage sludge at a location immediately prior to intermixing thereof in the mixing gap.

2. The apparatus as defined in claim 1, wherein said at least one drive means drives said one conveyor device onto which there is deposited the sewage sludge.

3. The apparatus as defined in claim 2, wherein the other conveyor device is stationary during driving of said at least one conveyor device, said stationary conveyor device defining a stationary boundary means for said mixing gap.

4. The apparatus as defined in claim 1, wherein said means for establishing a relative movement between said conveyor devices comprises a respective drive means for each of said conveyor devices for driving each said conveyor device at respectively different speeds.

5. The apparatus as defined in claim 4, wherein the other conveyor device is driven by its drive means at a greater speed than said at least one conveyor device at which there is deposited the sewage sludge.

6. The apparatus as defined in claim 1, wherein each conveyor device comprises a surface means, said means for establishing a relative movement between said two conveyor devices comprises a respective drive means for each of said conveyor devices for driving each of the surface means of said conveyor devices at respectively different speeds.

7. The apparatus as defined in claim 1, wherein each of said conveyor devices comprises an endless conveyor band.

8. The apparatus as defined in claim 1, wherein said radiation means comprises electron beam-radiating means.

9. An apparatus for irradiating sewage sludge with radiation having a sterilizing effect, comprising:
a conveyor system incorporating means for providing at least two cooperating conveyor devices,
means for supplying and depositing sewage sludge onto at least one of said conveyor devices,
said means for supplying and depositing sewage sludge onto at least one of said conveyor devices comprises a sewage sludge container for supplying the sewage sludge, and spray nozzle means for spraying sewage sludge from the sewage sludge container onto said at least one conveyor device, said spray nozzle means including a spray nozzle and pump means for pumping sewage sludge from the sewage sludge container through the spray nozzle onto said at least one conveyor device, said conveyor devices being positioned relative to one another so as to form therebetween a passageway for the throughflow of the deposited sewage sludge, said passageway defining a mixing gap for the intermixing of the sewage sludge contained therein, means for establishing a relative movement between said two conveyor devices, said means for establishing a relative movement between said two conveyor devices comprises at least one drive means for driving at least one of said conveyor devices, radiation means positioned relative to said conveyor system for irradiating the sewage sludge at a location immediately prior to intermixing thereof in the mixing gap.

10. The apparatus as defined in claim 9, wherein said at least one drive means drives said one conveyor device onto which there is deposited the sewage sludge.

11. The apparatus as defined in claim 10, wherein the other conveyor device is stationary during driving of said at least one conveyor device, said stationary conveyor device defining a stationary boundary means for said mixing gap.

12. The apparatus as defined in claim 9, wherein said means for establishing a relative movement between said conveyor devices comprises a respective drive means for each of said conveyor devices for driving each said conveyor device at respectively different speeds.

13. The apparatus as defined in claim 12, wherein the other conveyor device is driven by its drive means at a greater speed than said at least one conveyor device at which there is deposited the sewage sludge.

14. The apparatus as defined in claim 9, wherein each conveyor device comprises a surface means, said means for establishing a relative movement between said two conveyor devices comprises a respective drive means for each of said conveyor devices for driving each of the surface means of said conveyor devices at respectively different speeds.

15. The apparatus as defined in claim 9, wherein each of said conveyor devices comprises an endless conveyor band.

16. The apparatus as defined in claim 9, wherein said radiation means comprises electron beam-radiating means.

* * * * *